(12) United States Patent
Yokoyama et al.

(10) Patent No.: US 12,095,110 B2
(45) Date of Patent: Sep. 17, 2024

(54) WIRING COMPONENT

(71) Applicant: ASAHI KASEI KABUSHIKI KAISHA, Tokyo (JP)

(72) Inventors: Hiroya Yokoyama, Tokyo (JP); Minoru Sakata, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 477 days.

(21) Appl. No.: 17/595,399

(22) PCT Filed: May 14, 2020

(86) PCT No.: PCT/JP2020/019240
§ 371 (c)(1),
(2) Date: Nov. 16, 2021

(87) PCT Pub. No.: WO2020/235437
PCT Pub. Date: Nov. 26, 2020

(65) Prior Publication Data
US 2022/0216563 A1 Jul. 7, 2022

(30) Foreign Application Priority Data
May 17, 2019 (JP) ................. 2019-093920

(51) Int. Cl.
*H01M 50/298* (2021.01)
*C08L 71/12* (2006.01)
*H01M 50/50* (2021.01)
*H01M 50/588* (2021.01)
*H01M 50/591* (2021.01)

(52) U.S. Cl.
CPC ........... *H01M 50/298* (2021.01); *C08L 71/12* (2013.01); *H01M 50/50* (2021.01);
(Continued)

(58) Field of Classification Search
CPC .. H01M 50/298; H01M 50/591; H01M 50/50; H01M 50/588; C08L 71/12; C08L 2203/202
See application file for complete search history.

(56) References Cited

U.S. PATENT DOCUMENTS 4,808,647 A 2/1989 Abolins et al.
2009/0014199 A1 1/2009 Chiruvella et al.
(Continued)

FOREIGN PATENT DOCUMENTS

CN 102352085 A 2/2012
EP 2628759 A1 8/2013
(Continued)

OTHER PUBLICATIONS

Nov. 16, 2021, International Preliminary Report on Patentability issued in the International Patent Application No. PCT/JP2020/019240.
(Continued)

*Primary Examiner* — Sarah A. Slifka
(74) *Attorney, Agent, or Firm* — KENJA IP LAW PC

(57) ABSTRACT

Provided is a wiring component having a covering material which is made to be resistant to damages or displacements even when a large amount of electricity is conducted. A wiring component of the present disclosure is a wiring component including an electrically conductive member having an extension length of 450 mm or more, and a covering member covering the electrically conductive member, wherein the covering member contains a polyphenylene ether resin composition, and has a secondary shrinkage A (%) in an extension length direction of the covering member after being subjected to thermal aging at 130° C. for 24 hours satisfying: $A < 12.5 \times e^{-0.92t}$ (in the expression, t represents a thickness (in mm)).

10 Claims, 4 Drawing Sheets

(52) U.S. Cl.
CPC ....... *H01M 50/588* (2021.01); *H01M 50/591* (2021.01); *C08L 2203/202* (2013.01)

(56) References Cited

U.S. PATENT DOCUMENTS

| | | |
|---|---|---|
| 2009/0255708 A1 | 10/2009 | Sato et al. |
| 2010/0022690 A1 | 1/2010 | Araki et al. |
| 2016/0372853 A1 | 12/2016 | Kono et al. |
| 2020/0280153 A1 | 9/2020 | Yanagida et al. |

FOREIGN PATENT DOCUMENTS

| | | | |
|---|---|---|---|
| JP | 862212464 | A | 9/1987 |
| JP | 2003086167 | A | 3/2003 |
| JP | 2005105040 | A | 4/2005 |
| JP | 2008059976 | A | 3/2008 |
| JP | 2008152995 | A | 7/2008 |
| JP | 2008195741 | A | 8/2008 |
| JP | 2015138628 | A | 7/2015 |
| JP | 2016110796 | A | 6/2016 |
| JP | 2016199640 | A | 12/2016 |
| JP | 2018064366 | A | 4/2018 |
| JP | 2019057459 | A | 4/2019 |
| WO | 2015002145 | A1 | 1/2015 |

OTHER PUBLICATIONS

Aug. 11, 2020, International Search Report issued in the International Patent Application No. PCT/JP2020/019240.
Database WPI Week 198743 Thomson Scientific, London, GB; AN 1987-302928, XP002806580, 1987.

WIRING COMPONENT

TECHNICAL FIELD

The present disclosure relates to a wiring component.

BACKGROUND

Metal wiring components can be used for various purposes, such as connecting terminals of an electrical facility, e.g., an assembled battery having multiple batteries connected together, used in an emergency power supply facility. Such wiring components are often covered with an insulating resin (see PTL 1) in order to avoid the risk of short-circuit caused by contact with metal tools and other risks during operations.

CITATION LIST

Patent Literature

PTL 1: JP 2003-86167 A

SUMMARY

Technical Problem

In recent years, as the capacities and sizes of electrical facilities increase, the lengths of wiring components used in the electrical facilities and the like increase. Heat is generated when a large amount of electricity is conducted through a long wiring component, which may cause thermal shrinkage of a covering resin, resulting in cracks or displacements of the covering resin.

Accordingly, it would be helpful to provide a wiring component having a covering material which is made to be resistant to damages or displacements even when a large amount of electricity is conducted.

Solution to Problem

The present disclosure are as follows.
(1) A wiring component comprising:
  an electrically conductive member having an extension length of 450 mm or more; and
  a covering member covering the electrically conductive member,
  the covering member containing a polyphenylene ether resin composition, and
  having a secondary shrinkage A (%) in an extension length direction of the covering member after being subjected to thermal aging at 130° C. for 24 hours satisfying the following Expression (1):

$$A < 12.5 \times e^{-0.92t} \quad (1)$$

(in the Expression (1), e represents the base of natural logarithm, and t represents a thickness (in mm)).
(2) The wiring component according to (1), wherein an averaged cross-sectional area of the electrically conductive member is from 10.0 to 150 mm$^2$.
(3) The wiring component according to (1) or (2), wherein the electrically conductive member is composed of a single component.
(4) The wiring component according to any one of (1) to (3), wherein a ratio of the coverage of the electrically conductive member by the covering member is from 70 to 95%.
(5) The wiring component according to any one of (1) to (4), wherein an average of distances C (average of clearances C) between the electrically conductive member and the covering member is 2 mm or less.
(6) The wiring component according to any one of (1) to (5), wherein the polyphenylene ether resin composition has a surface hardness of 60 or more.
(7) The wiring component according to any one of (1) to (6), wherein an occupancy ratio of the electrically conductive member in an inner space of the covering member is 40 volume percent or more.
(8) The wiring component according to any one of (1) to (7), wherein the covering member comprises a plurality of members that are capable of mating with each other.
(9) The wiring component according to any one of (1) to (8), wherein the polyphenylene ether resin composition has a Vicat softening point of 140° C. or higher.
(10) The wiring component according to any one of (1) to (8), wherein the polyphenylene ether resin composition has a flexural modulus of 1800 MPa or more.

Advantageous Effect

Because the wiring component of the present disclosure has the above-described structure, the wiring component is made to be resistant to damages or displacements even when a large amount of electricity is conducted.

DETAILED DESCRIPTION

The following provides a detailed description of an embodiment of the present disclosure (hereinafter, referred to as the "present embodiment"). The present disclosure is not limited to the following embodiment, but may be performed by varying within the scope of the subject thereof.

[Wiring Component]

A wiring component of the present embodiment is a wiring component including an electrically conductive member having an extension length of 450 mm or more, and a covering member covering the electrically conductive member, wherein the covering member contains a polyphenylene ether resin composition, and has a secondary shrinkage A (%) in an extension length direction of the covering member after being subjected to thermal aging at 130° C. for 24 hours satisfying the following Expression (1):

$$A < 12.5 \times e^{-0.92t} \quad (1)$$

(in the Expression (1), e represents the base of natural logarithm, and t represents a thickness (in mm)).

The extension direction may be the direction along a surface of the electrically conductive member from one end to the other end of the electrically conductive member.

Figure 1:
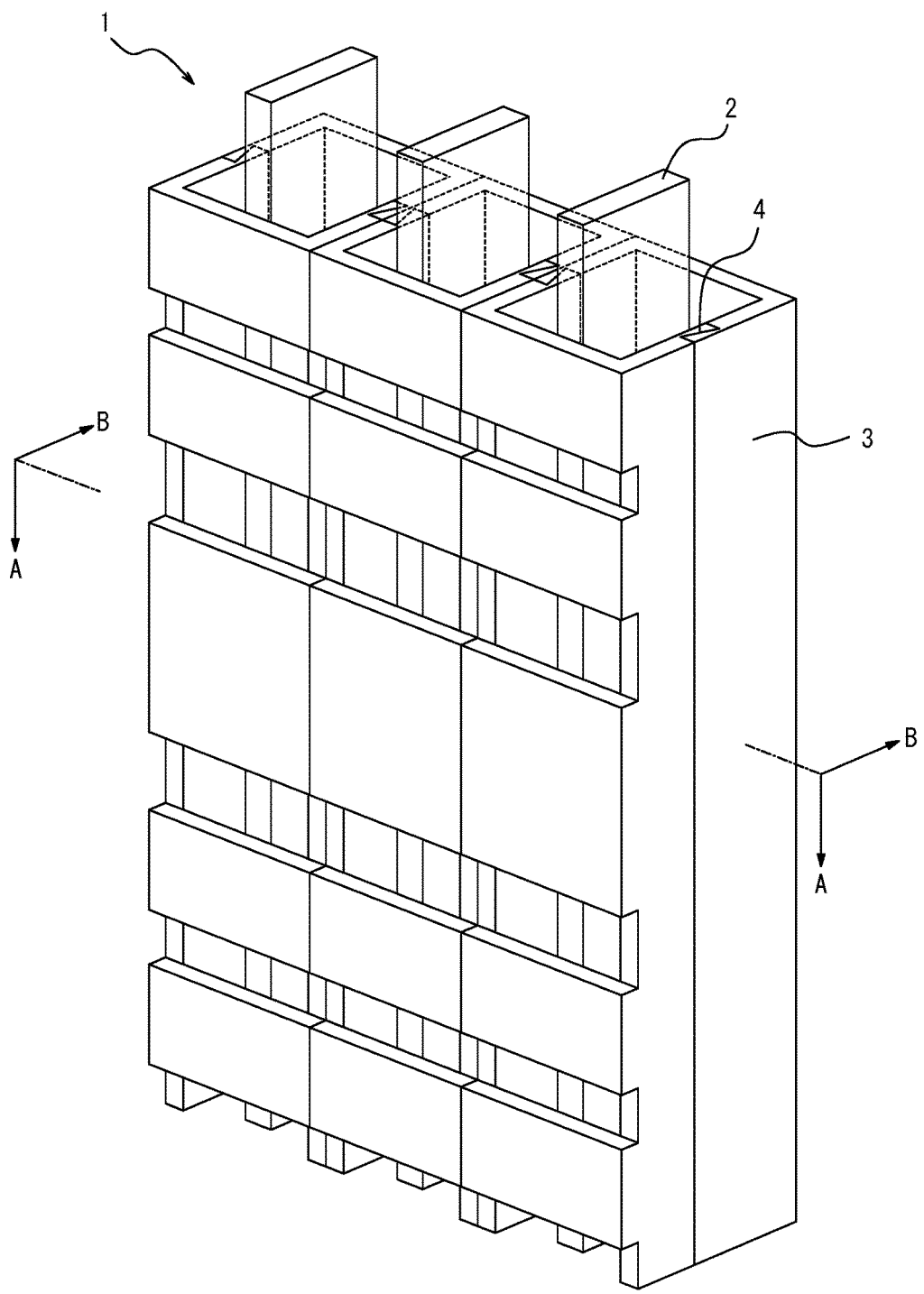
FIG. 1 is a perspective view illustrating a part of a wiring component of an example of the present embodiment.

FIG. 1 illustrates an example of a wiring component 1 of the present embodiment. At least parts of electrically conductive members 2 are covered with a covering member 3.

In the wiring component 1 of the present embodiment, at least a part of one electrically conductive member 2 may be covered with the covering member 3, or at least parts of a plurality of electrically conductive members 2 may be covered with the covering member 3.

In the wiring component 1 of the present embodiment, the electrically conductive members 2 may extend through the covering member 3 from one end to the other end of the extension direction of the covering member 3. The input and output portions to and from the electrically conductive members 2 may be exposed without being covered with the covering member 3 (FIGS. 1 and 4).

Figure 2A:
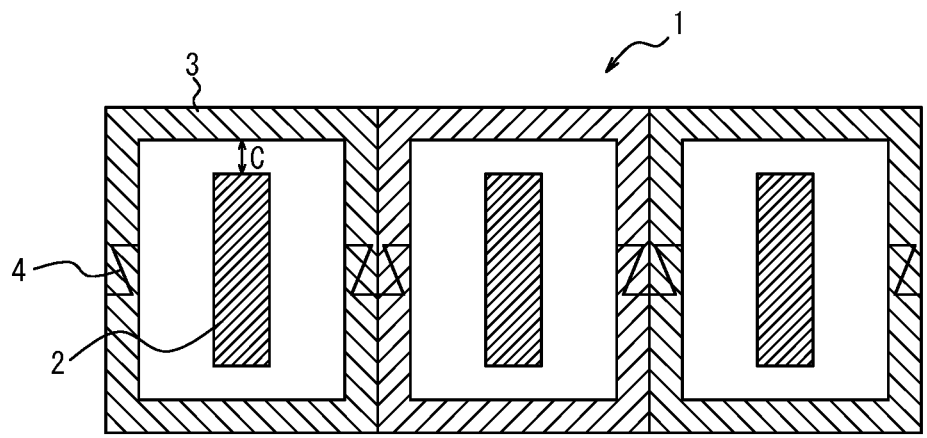
FIG. 2(A) is a cross-sectional view of the wiring component of the example of the present embodiment when being cut along a plane orthogonal to the extension direction thereof (the plane along Line A-A illustrated in FIG. 1)
Figure 3A:
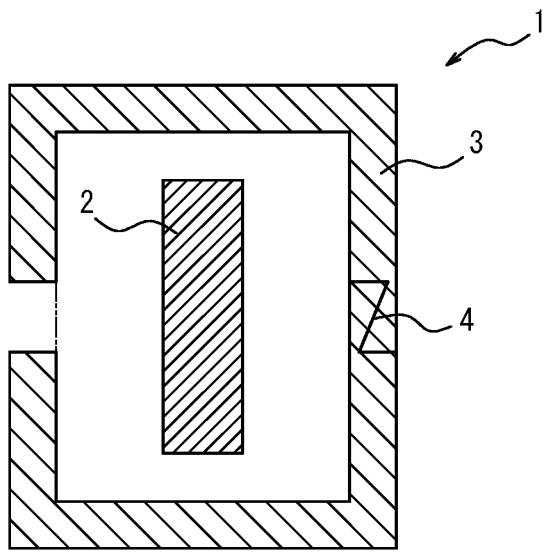
FIG. 3(A) is a cross-sectional view of a wiring component of another example of the present embodiment when being cut along a plane orthogonal to the extension direction thereof.
Figure 3B:
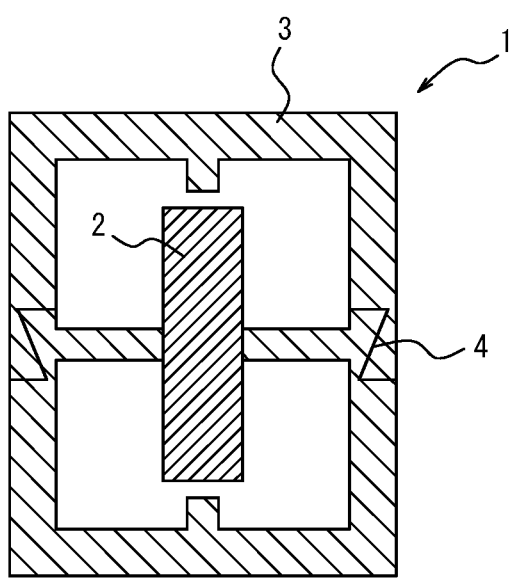
FIG. 3(B) is a cross-sectional view of a wiring component of a further example of the present embodiment when being cut along a plane orthogonal to the extension direction thereof.

The covering member 3 may be provided without contacting electrically conductive members 2 (FIGS. 2(A) and 3(A)), or may be provided in contact with a part of an electrically conductive member 2 (FIG. 3(B)), or may be provided in contact with the entire surface of an electrically conductive member.

The wiring component 1 of the present embodiment may be straight (FIGS. 1-3), or have at least one bent portion (preferably two or more bent portions) (FIG. 4).

An electrically conductive member 2 and the covering member 3 may have the same thickness (FIGS. 1 and 4) or different thicknesses in the extension direction. The distances C between an electrically conductive member 2 and the covering member may be constant or may be varied.

In the wiring component 1 of the present embodiment, the electrically conductive member 2 and the covering member 3 covering the electrically conductive member 2 may be covered with a further covering member.

In the wiring component of the present embodiment, the thickness of the covering member is preferably from 0.4 to 2.5 mm, more preferably from 0.6 to 2.0 mm, and even more preferably from 0.8 to 1.5 mm, from the viewpoints of providing electrical conductivity and preventing leakage currents, as well as achieving size reduction and the light-weightiness. Note that the thickness of the covering member can be measured by the method described in the EXAMPLES section below.

The secondary shrinkage A of the wiring component of the present embodiment is less than $12.5 \times e^{-0.92t}$%, preferably less than $9.6 \times e^{-0.92t}$%, and more preferably less than $9.0 \times e^{-0.92t}$%, from the viewpoint that the covering member is made to be resistant to damages or displacements even when a large amount of electricity is conducted.

Note that the secondary shrinkage A can be measured by the method described in the EXAMPLES section below.

The inventors have diligently made attempts to identify the cause of damages and displacements of a covering members in a wiring component. The main cause was identified as thermal shrinkage in the extension direction of the covering member which is induced when a large amount of electricity is conducted, rather than thermal shrinkage in the circumferential direction orthogonal to the extension direction. The inventors have found that preventing thermal shrinkage in the extensional direction of a covering member is particularly effective in solving the issue of breakages and displacements.

The secondary shrinkage A can be reduced, for example, by adjusting the composition of a polyphenylene ether resin composition so as to increase the Vicat softening point. Specific methods of adjusting the composition so as to increase the Vicat softening point include increasing the content ratio of polyphenylene ether in the polyphenylene ether resin composition, and employing a resin having a high Tg and/or a high melting point as a resin component other than a polyphenylene ether-based resin which will be described below.

The secondary shrinkage A can also be reduced by increasing the mold temperature (e.g., setting to be 80° C. or higher), increasing the temperature of the resin (e.g., setting to be 250° C. or higher), increasing the holding pressure (e.g., setting to be 20% or higher), or extending the injection time (e.g., setting to be 15 seconds or longer), for example, upon injection molding.

In the wiring component of the present embodiment, the ratio of the coverage of the electrically conductive member by the covering member is preferably from 70 to 95%, more preferably from 75 to 95%, and even more preferably from 80 to 95%, from the viewpoints of providing electrical conductivity and preventing leakage currents.

The ratio of the coverage refers to the ratio of the area of the inner surface of the covering member defining the outer surface of the inner space of the covering member, to the area of the outer surface of the electrically conductive member.

Here, the inner space of the covering member refers to the region into which the covering member can be accommodated. More specifically, in the case where the inner surface of the covering member is formed as a closed space (closed system), the inner space of the covering member is the region defined by the inner surface of the covering member. Alternatively, in the case where the inner surface of the covering member is formed as, at least in part, an opened space (open system) in the perimeter of the extension direction and/or in the extension direction (FIG. 1), the inner space of the covering member is the region defined by the inner surface of the covering member and the virtual inner surface connecting between the inner surfaces in the perimeter of the opened space (open space).

The covering member may cover all or a part of the perimeter of an electrically conductive member in the extension direction thereof (around the extension direction). Except for the input and output portions to and from the electrically conductive member, the covering member may cover all or a part of the electrically conductive member in the extension direction thereof.

In the wiring component of the present embodiment, the average of the distances C (average of the clearances C) between the electrically conductive member and the covering member is preferably 2 mm or less, more preferably 1 mm or less, even more preferably 0.5 mm or less, and particularly preferably 0 mm (that is, the electrically conductive member and the covering member are in contact with each other across the entire coverage region), from the viewpoint of facilitating dissipation of heat of the electrically conductive member to the outside while reducing occurrence of displacements of the covering member.

A distance C between the electrically conductive member and the covering member is the minimum distance between the two members in a cross-section when the wiring component is cut along a plane perpendicular to the extension direction thereof (FIG. 2(A)). The average of the distances C between the electrically conductive member and the covering member is the average of the minimum distances between the two members across the extension direction of the wiring component. Although the minimum distances may be constant or may be varied across the extension direction, the minimum distances are preferably constant.

In the case where an electrically conductive member is swingable inside the covering member, the distances between the electrically conductive member and the covering member may vary. In this case, the distance C between the electrically conductive member and the covering member may be defined as the minimum distance between the two members when they are placed on a horizontal surface. Note that the average of the clearances C can be measured by the method described in the EXAMPLES section below.

The surface hardness of the wiring component of the present embodiment is preferably 60 or more, more preferably 80 or more, and even more preferably 90 or more from the viewpoint that the wiring component is made to be resistant to deformations.

Note that the surface hardness is the Rockwell hardness expressed in the M scale which is measured in accordance with JIS K 7202-2.

The surface hardness of the wiring component may be the surface hardness of the surface of the covering member forming the surface of the wiring component.

The flexural modulus of the wiring component of the present embodiment is preferably 1800 MPa or more, more preferably from 2000 to 3000 MPa, and even more preferably from 2200 to 3000 MPa, from the viewpoint that the wiring component is made to be resistant to deformations.

Note that the flexural modulus is a value measured in accordance with ISO 178.

The flexural modulus of the covering member forming the surface of the wiring component may be used as the flexural modulus of the wiring component.

In the wiring component of the present embodiment, the occupancy ratio of the electrically conductive member in the inner space of the covering member is preferably from 40 to 100 volume %, more preferably from 40 to 90 volume %, more preferably from 50 to 90 volume %, and particularly preferably from 60 to 90 volume %, from the viewpoint of facilitating dissipation of heat of the electrically conductive member to the outside while reducing occurrence of displacements of the covering member.

The occupancy ratio refers to the ratio of the volume of the electrically conductive member present inside the inner space of the covering member, to the volume of the inner space of the covering member.

(Electrically Conductive Member)

An electrically conductive member has an extension length of 450 mm or more, preferably from 500 to 1500 mm, more preferably from 550 to 1200 mm, and even more preferably from 600 to 700 mm. The extension length (length in the extension direction) may be the length of the electrically conductive member along a surface of the electrically conductive member in the direction extending from one end to the other end.

The shape of the electrically conductive members is not particularly limited, and may be selected as appropriate according to the purpose and the application. The cross-sectional shape (shape in a cross-section perpendicular to the extension direction) may be a rectangle as illustrated in FIG. 1. This, however, is not limitative, and the cross-sectional shape may be a quadrangle other than a rectangle, a circle, an oval, or the like. The cross-sectional shape may be the same or may vary across the entire length in the extension direction.

Figure 4A:
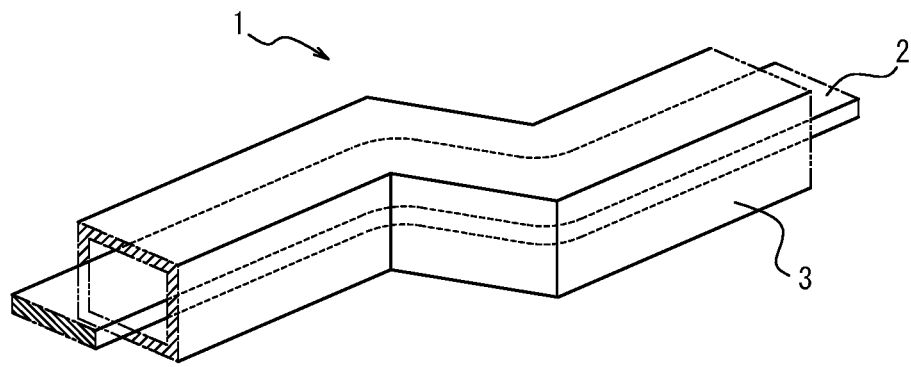
FIG. 4(A) is a perspective view illustrating a part of a wiring component of a first variation of the present embodiment.
Figure 4B:
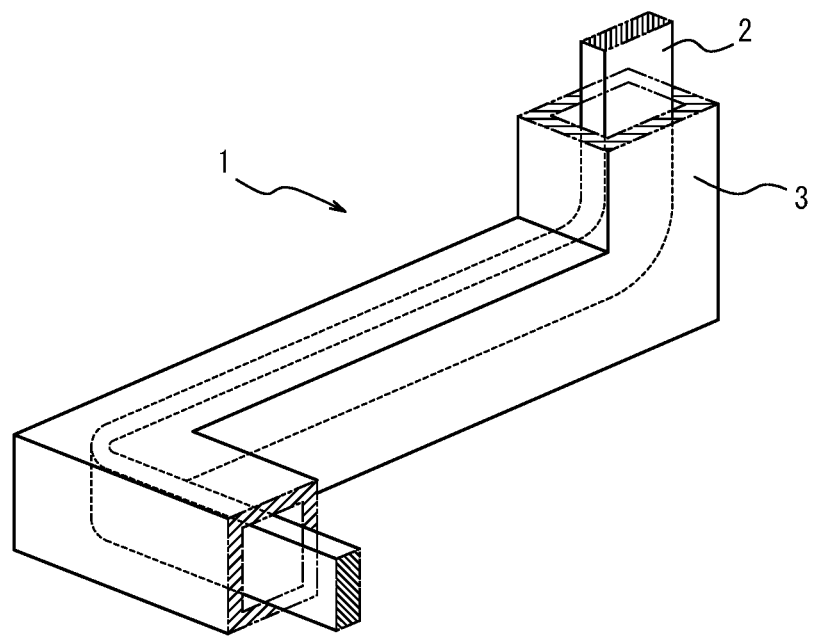
FIG. 4(B) is a perspective view illustrating a part of a wiring component of a second variation of the present embodiment.
Figure 4C:
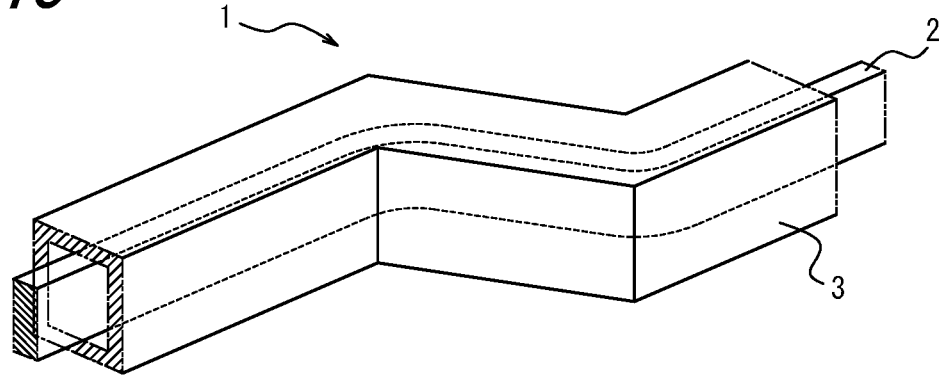
FIG. 4(C) is a perspective view illustrating a part of a wiring component of a third variation of the present embodiment.

The overall shape may be a straight shape as illustrated in FIG. 1, or a bent or twisted shape as illustrated in FIGS. 4(A) to 4(C) may also be possible.

The averaged cross-sectional area of the electrically conductive member may be, for example, from 10.0 to 150 $mm^2$, or may be from 12.5 to 120 $mm^2$ or from 15.0 to 100 $mm^2$. The averaged cross-sectional area refers to the average of the cross-sectional areas along the entire length of the electrically conductive member in the extension direction. An averaged area of 10.0 $mm^2$ or more tends to further facilitate conduction of a large amount of electricity. An averaged area of 150 $mm^2$ or less tends to facilitate size reduction of an electrical facility. The electrically conductive member is preferably composed of a single component from the viewpoint of facilitating manufacturing of the wiring component, in addition to the viewpoint of the aforementioned size reduction. For example, the electrically conductive member is preferably not to be structured such that a plurality of parts are coupled, braided, stacked, or otherwise related to each other.

The electrically conductive member may have a bent portion from the viewpoint that the electrically conductive member and the covering member are made to be resistant to displacements. The number of bent portions may be one, or may be two or more (FIG. 4).

The material forming the electrically conductive member is not particularly limited as long as it has conductivity. Exemplary materials include metals such as aluminum, aluminum alloys, copper, copper alloys, silver, and combinations of these, for example. A conductor having a plated surface may also be used as the electrically conductive member.

(Covering Member)

Figure 2B:
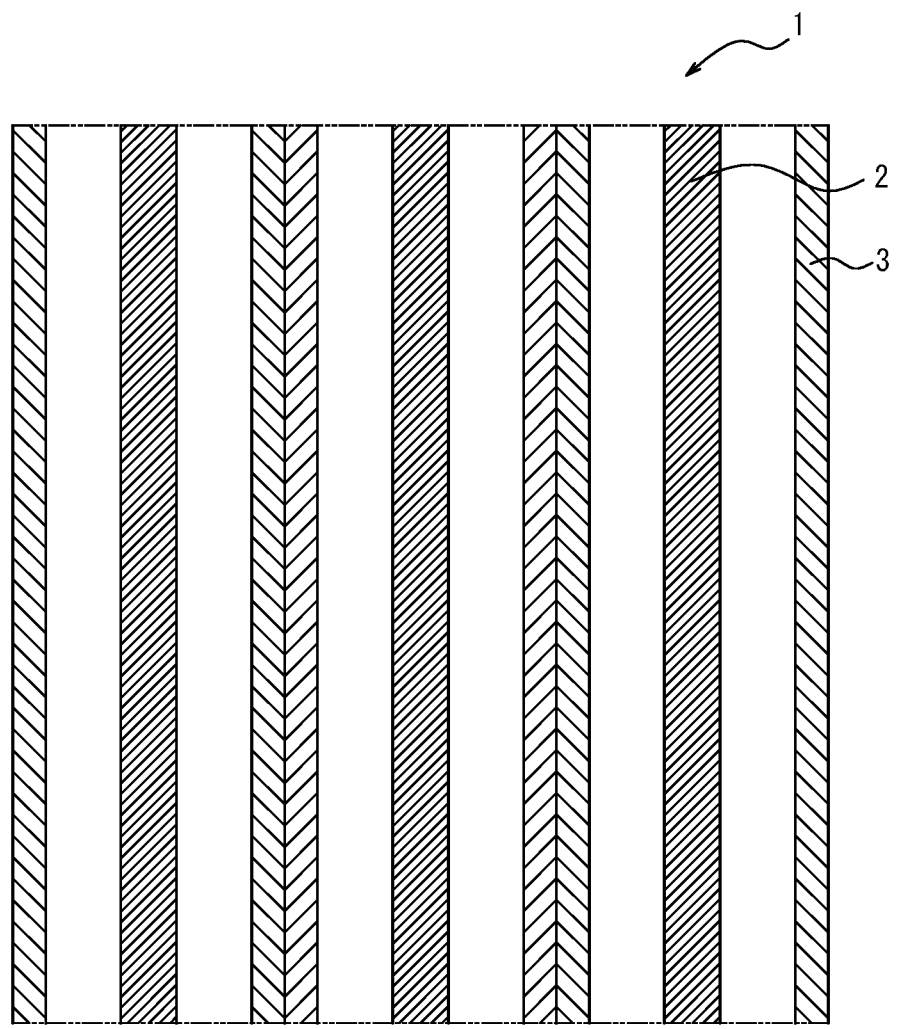
FIG. 2(B) is a cross-sectional view of the wiring component of the example of the present embodiment when being cut along a plane along the extension direction thereof (the plane along Line B-B illustrated in FIG. 1)

The covering member may be composed of a single member (FIG. 4) or may be composed of a plurality of members that can be mated with each other (FIGS. 1-3). Particularly, the covering member preferably includes a plurality of members (e.g., two members) that can be mated with each other for the reason of ease of manufacturing. The plurality of members may be connected, for example, at mating sections 4 (FIG. 1).

The mode of mating is not limited to the one illustrated in FIG. 1 or the like, and a plurality of members may be joined together in the extension direction, for example.

The covering member contains a polyphenylene ether resin composition.

The polyphenylene ether resin composition contains a polyphenylene ether-based resin, and may also contain a resin component other than the polyphenylene ether-based resin and/or an additional component.

—Polyphenylene Ether-Based Resin—

The polyphenylene ether-based resin contains polyphenylene ether (herein sometimes referred to as "PPE") and may also contain a polystyrene-based resin. In other words, the PPE-based resin may be a mixed resin made from PPE and a polystyrene-based resin, or a resin consisting only of PPE.

Examples of the PPE include a homopolymer formed from a repeating unit structure represented by the following formula (1), and a copolymer including a repeating unit structure represented by the following formula (1), for example.

One PPE may be used alone or two or more PPEs may be used in a combination.

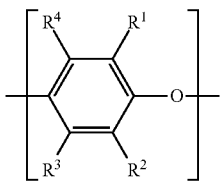

(1)

In the formula (1), $R^1$, $R^2$, $R^3$, and $R^4$ are each independently monovalent groups selected from the group consisting of hydrogen atom, halogen atom, primary alkyl groups having 1 to 7 carbon atoms, secondary alkyl groups having 1 to 7 carbon atoms, phenyl group, haloalkyl groups, aminoalkyl groups, hydrocarbon oxy groups, and halohydrocarbon oxy groups in which at least two carbon atoms separate a halogen atom from an oxygen atom.

From the viewpoints of the fluidity, the rigidity, and the heat aging resistance during processing, the PPE preferably has a reduced viscosity from 0.15 to 2.0 dL/g, more preferably from 0.20 to 1.0 dL/g, and even more preferably from 0.30 to 0.70 dL/g. The reduced viscosity is measured with a Ubbelohde type viscosity tube under the condition of 30° C. using a chloroform solution in a concentration of 0.5 g/dL.

Specific examples of the PPE include, but are not limited to, homopolymers such as poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether); and copolymers such as copolymers of 2,6-dimethylphenol and other phenols (e.g., 2,3,6-trimethyl phenol or 2-methyl-6-butylphenol), for example. Among these, from the viewpoints of an excellent balance between tenacity and rigidity of the resulting resin composition and availability of raw materials, more preferred are poly(2,6-dimethyl-1,4-phenylene ether) and a copolymer of 2,6-dimethyl phenol and 2,3,6-trimethylphenol, and particularly preferred is poly(2,6-dimethyl-1,4-phenylene ether).

The PPE may be produced by a well-known method. Examples of the production method of the PPE include, but are not limited to, a method of oxidatively polymerizing 2,6-xylenol using a complex of a cuprous salt and an amine as a catalyst as described in U.S. Pat. No. 3,306,874 B to Hay, and methods described in U.S. Pat. Nos. 3,306,875 B, 3,257,357 B, 3,257,358 B, JP S52-17880 B, JP S50-51197 A, JP S63-152628 A, and so on, for example.

The PPE may be a modified PPE produced through a reaction of the homopolymer and/or the copolymer described above with a styrene monomer or a derivative thereof, and/or an α,β-unsaturated carboxylic acid or a derivative thereof. Here, the grafting amount or the addition amount of the styrene monomer or the derivative thereof and/or the α,β-unsaturated carboxylic acid or the derivative thereof is preferably from 0.01 to 10 mass % with respect to 100 mass % of the polyphenylene ether-based resin.

The method of producing the modified PPE is exemplified by, for example, a method including reacting the PPE in a molten state, a solution state, or a slurry state at a temperature from 80 to 350° C. in the presence or absence of a radical generator.

As the PPE, a mixture of the homopolymer and/or the copolymer with the modified PPE in any ratio may be used.

Examples of the polystyrene-based resin include an atactic polystyrene, a rubber-reinforced polystyrene (high impact polystyrene, HIPS), a styrene-acrylonitrile copolymer (AS) having a styrene content of 50 mass % or more, and an AS resin in which such a styrene-acrylonitrile copolymer is reinforced with a rubber, and the atactic polystyrene and/or the high impact polystyrene are preferable.

These polystyrene-based resins may be used alone or in a combination of two or more thereof.

As the polyphenylene ether-based resin, a polyphenylene ether-based resin containing PPE and a polystyrene-based resin in a mass ratio of the PPE to the polystyrene-based resin (PPE/polystyrene-based resin) of 97/3 to 5/95 can be used. Use of such a resin in the covering member tends to prevent warping of the covering member to thereby further prevent breakages or displacements of the covering member when a large amount of electricity is conducted. The mass ratio of the PPE to the polystyrene-based resin (PPE/polystyrene-based resin) is more preferably from 90/10 to 40/60, even more preferably from 90/10 to 50/50, and particularly preferably from 90/10 to 60/40, from the viewpoint of producing a composition having a high fluidity and a high Vicat softening point.

—Resin Component Other than Polyphenylene Ether-Based Resin—

Examples of the resin component other than the polyphenylene ether-based resin include a block copolymer containing two or more polymer blocks A composed primarily of a vinyl aromatic compound and one or more polymer blocks B composed primarily of a conjugated diene compound, and/or a hydrogenated block copolymer formed by hydrogenating a block copolymer containing two or more polymer blocks A composed primarily of a vinyl aromatic compound and one or more polymer blocks B composed primarily of a conjugated diene compound; polypropylene-based resins; polyamide-based resins; polyphenylene sulfide; and thermoplastic elastomers (such as polyolefin-based elastomers).

——Block Copolymer and/or Hydrogenated Block Copolymer——

The polyphenylene ether resin composition containing a block copolymer containing two or more polymer blocks A composed primarily of a vinyl aromatic compound and one or more polymer blocks B composed primarily of a conjugated diene compound, and/or a hydrogenated block copolymer formed by hydrogenating a block copolymer containing two or more polymer blocks A composed primarily of a vinyl aromatic compound and one or more polymer blocks B composed primarily of a conjugated diene compound (they are herein sometimes referred to as the "block copolymer and/or hydrogenated block copolymer") can improve the molding processability into the covering member.

The block copolymer and/or hydrogenated block copolymer may include a block copolymer other than the block copolymer and/or hydrogenated block copolymer to the extent that the effects of the present disclosure are not impaired.

A polymer block A composed primarily of a vinyl aromatic compound refers to a homopolymer block of a vinyl aromatic compound, or a copolymer block of a vinyl aromatic compound and a conjugated diene compound in which the content of constituent units derived from the vinyl aromatic compound in the polymer block A is more than 50 mass %, preferably 70 mass % or more. This polymer block A may be substantially free of conjugated diene compounds or may contain no conjugated diene compound. The term "substantially free of" includes cases where a conjugated diene compound is contained to the extent that the effects of the present disclosure are not impaired, and the content may be, for example, 3 mass % or less with respect to the total amount of the polymer block A.

A polymer block B composed primarily of a conjugated diene compound refers to a homopolymer block of a conjugated diene compound, or a copolymer block of a conjugated diene compound and a vinyl aromatic compound in which the content of constituent units derived from the conjugated diene compound in the polymer block B is more than 50 mass %, preferably 70 mass % or more. This polymer block B may be substantially free of vinyl aromatic compounds or may contain no vinyl aromatic compound. The term "substantially free of" includes cases where a vinyl aromatic compound is contained to the extent that the effects of the present disclosure are not impaired, and the content may be, for example, 3 mass % or less with respect to the total amount of the polymer block B.

Two copolymers and/or hydrogenated block copolymers are preferably combined to be used as the block copolymer and/or hydrogenated block copolymer described above. Block copolymers and/or hydrogenated block copolymers which are conventionally known and commercially available may be combined, and any block copolymers and/or hydrogenated block copolymers may be used.

The vinyl aromatic compound forming the block copolymer and/or hydrogenated block copolymer may be selected from one or two or more of, for example, styrene, α-methylstyrene, vinyltoluene, p-tert-butylstyrene, and diphenylethylene, and the like, and styrene is particularly preferred.

The conjugated diene compound forming the polymer block B may be selected from one or two or more of, for example, butadiene, isoprene, 1,3-pentadiene, and 2,3-dimethyl-1,3-butadiene, and the like, and butadiene, isoprene, and a combination of these are particularly preferred.

The bonding form of butadiene prior to the hydrogenation can typically be determined using an infrared spectrophotometer, an NMR spectrometer, and the like.

The block copolymer and/or hydrogenated block copolymer are preferably a block copolymer and/or hydrogenated block copolymer containing two or more blocks A and one or more blocks B, and more preferably a vinyl aromatic compound-conjugated diene compound block copolymer and/or a hydrogenated block copolymer thereof, having a structure in which A-B-A block units are bonded together (in which the molecular weights of the two blocks A and one block B may be the same or different).

The polymer blocks A composed primarily of a vinyl aromatic compound and the polymer block B composed primarily of a conjugated diene compound may each have a structure in which the distribution of the vinyl aromatic compound or the conjugated diene compound in the molecular chain of the polymer block is random, tapered (in which the amount of the monomer increases or decreases along the molecular chain), or the like. In the case where the block copolymer and/or hydrogenated block copolymer contain two or more polymer blocks A or B, the polymer blocks A or B may have the same structure or different structures.

The at least one polymer block B contained in the block copolymer and/or hydrogenated block copolymer may be a polymer block in which the 1,2-vinyl bonding amount in the conjugated diene compound prior to hydrogenation is from 70 to 90%. In addition, the at least one polymer block B contained in the block copolymer and/or hydrogenated block copolymer may be a polymer block which contains both a polymer block (polymer block B1) having a 1,2-vinyl bonding amount in the conjugated diene compound prior to hydrogenation of 70 to 90% and a polymer block (polymer block B2) having a 1,2-vinyl bonding amount in the conjugated diene compound prior to hydrogenation of 30 to 70%. A block copolymer having such a block structure is represented as A-B2-B1-A, for example, and can be produced using a well-known polymerization method to control the 1,2-vinyl bonding amounts based on adjusted feed sequences of respective monomer units.

The content of the bonded vinyl aromatic compound in the block copolymer and/or hydrogenated block copolymer is preferably from 15 to 80 mass %, more preferably from 25 to 80 mass %, and even more preferably from 30 to 75 mass %.

The block copolymer and/or the block copolymer in the hydrogenated block copolymer can be subjected to a hydrogenation reaction to hydrogenate aliphatic double bonds in the polymer block B composed primarily of a conjugated diene compound, for example, so as to be used as a hydrogenated copolymer block (hydrogenated product of a vinyl aromatic compound-conjugated diene compound block copolymer). The hydrogenation ratio to such aliphatic double bonds is preferably 80% or more, and more preferably 95% or more.

Note that the hydrogenation ratio can typically be determined using an infrared spectrophotometer or an NMR spectrometer.

The number average molecular weight (Mnc) of the block copolymer and/or hydrogenated block copolymer is preferably from 40,000 to 200,000, more preferably from 41,000 to 180,000, even more preferably from 42,000 to 120,000, still more preferably from 43,000 to 100,000, and particularly preferably from 45,000 to 100,000. The number average molecular weight is preferably 40,000 or more from the viewpoint of the impact resistance, and is preferably be 120,000 or less from the viewpoints of dispersibility to a polyphenylene ether-based resin, the fluidity, and the mold-releasing property.

Note that the number average molecular weight (Mnc) of the block copolymer and/or hydrogenated block copolymer can be measured as follows. Specifically, measurements on standard polystyrene (standard polystyrene with molecular weights of U.S. Pat. Nos. 3,650,000, 2,170,000, 1,090,000, 681,000, 204,000, 52,000, 30,200, 13,800, 3,360, 1,300, and 550) may be carried out using Gel Permeation Chromatography System 21 manufactured by Showa Denko K.K. (columns: one K-G, one K-800 RL, and one K-800R manufactured by Showa Denko K.K., which are connected in series; column temperature: 40° C.; solvent: chloroform; solvent flow rate: 1.0 mL/min; sample concentration: 1-g/L chloroform solution of the hydrogenated block copolymer) and plotting a calibration curve. The UV (ultraviolet) wavelength of the detection unit is set to 254 nm for both the standard polystyrene and the hydrogenated block copolymer component.

Among the polymer blocks A contained in the block copolymer and/or hydrogenated block copolymer, the number average molecular weight (MncA) of at least one block A is preferably 10,000 or more, more preferably 15,000 or more, and even more preferably more than 15,000, from the viewpoint of achieving a further superior impact resistance. From the viewpoint of achieving a further superior impact resistance, the number average molecular weights (MncA)

of all polymer blocks A contained in the block copolymer and/or hydrogenated block copolymer are preferably 10,000 or more. Inclusion of polymer blocks A having a number average molecular weight (MncA) of 10,000 or more is preferred because the block copolymer satisfying this condition is satisfactorily admixed with PPE in the polyphenylene ether-based resin having a weight average molecular weight (Mwppe) from 15,000 to 25,000 and a molecular weight distribution (Mwppe/Mnppe) from 1.5 to 3.0, and excellent heat resistance and mechanical property can be imparted to a resultant resin composition.

For example, the number average molecular weight (MncA) of the polymer blocks A composed primarily of a vinyl aromatic compound, contained in the block copolymer and/or hydrogenated block copolymer can be calculated as follows. For example, in the case of the A-B-A structure, the number average molecular weight (MncA) can be calculated based on the number average molecular weight (Mnc) of the block copolymer and/or hydrogenated block copolymer using the calculation formula: (MncA)=(Mnc)×the ratio of the amount of bonded vinyl aromatic compounds/2, assuming that the molecular weight distribution of the block copolymer and/or hydrogenated block copolymer is 1 and that two polymer blocks A composed primarily of a vinyl aromatic compound have the same molecular weight. Similarly, in the case of an A-B-A-B block copolymer component, the number average molecular weight (MncA) can be determined using the calculation formula: (MncA)=(Mnc)×the ratio of the amount of bonded vinyl aromatic compounds/3. In the case where the sequences of the block structures A and the block structure B are known before actual synthesis of a vinyl aromatic compound-conjugated diene compound block copolymer, the number average molecular weight may be calculated from the ratio of the block structures A based on the number average molecular weight (Mnc) of the block copolymer, to be measured, without using the above calculation formula.

The block copolymer and/or hydrogenated block copolymer preferably contain a polymer block B having a number average molecular weight (MncB) of 15,000 or more, and more preferably contain a polymer block B having a number average molecular weight of 40,000 or more from the viewpoint of achieving a further superior impact resistance.

The number average molecular weight (MncB) of the polymer block B composed primarily of a conjugated diene compound, contained in the block copolymer and/or hydrogenated block copolymer, can be calculated in the manner similar to the method as described above.

In particular, it is preferred that the block copolymer and/or hydrogenated block copolymer have a number average molecular weight (Mnc) ranging from 40,000 to 120,000, and contain a polymer block A having a number average molecular weight (MncA) of 10,000 or more.

The block copolymer and/or hydrogenated block copolymer may be produced using any method as long as they have the structure as described above. Examples of production methods include those described in, for example, JP S47-11486 A, JP S49-66743 A, JP S50-75651 A, JP S54-126255 A, JP S56-10542 A, JP S56-62847 A, JP S56-100840 A, JP 2004-269665 A, GB 1130770 B, U.S. Pat. Nos. 3,281,383 B, 3,639,517 B, GB 1020720 B, U.S. Pat. No. 3,333,024 B, and U.S. Pat. No. 4,501,857 B.

The block copolymer and/or hydrogenated block copolymer may be a modified block copolymer and/or hydrogenated block copolymer produced by methods, such as a method including reacting a block copolymer and/or a hydrogenated block copolymer with an α,β-unsaturated carboxylic acid or a derivative thereof (an ester compound or an acid anhydride compound such as maleic anhydride), in the presence or absence of a radical precursor, in a molten state, a solution state, or a slurry state, at a temperature from 80 to 350° C. (for example, the grafting amount or the addition amount of the α,β-unsaturated carboxylic acid or the derivative thereof is from 0.01 to 10 mass % with respect to 100 mass % of the block copolymer and/or hydrogenated block copolymer). Or, the block copolymer and/or hydrogenated block copolymer may also be a mixture of the above-described modified block copolymer and/or hydrogenated block copolymer mixed with an unmodified block copolymer and/or hydrogenated block copolymer in an arbitrary ratio.

From the viewpoints of the fluidity, the heat resistance, and the impact resistance, the content of the block copolymer and/or hydrogenated block copolymer in the polyphenylene ether resin composition is preferably from 1 to 40 mass %, more preferably from 2 to 30 mass %, and even more preferably from 3 to 20 mass %, with respect to 100 mass % of the polyphenylene ether resin composition.

——Polypropylene-Based Resin——

The polyphenylene ether resin composition may include a polypropylene-based resin. Examples of such a polypropylene-based resin include propylene homopolymer, copolymers of propylene with another monomer, and modified products thereof.

The polypropylene-based resin is preferably crystalline, and is more preferably a crystalline propylene homopolymer or a crystalline propylene-ethylene block copolymer. Alternatively, the polypropylene-based resin may be a mixture of a crystalline propylene homopolymer and a crystalline propylene-ethylene block copolymer.

The polypropylene-based resins may be used alone or in a combination of two or more.

Examples of the other monomer that can be copolymerized with propylene include, for example, α-olefins such as butene-1 and hexene-1. The polymerization form is not particularly limited, and the polypropylene-based resin may be a random copolymer, a block copolymer, or the like.

For example, the crystalline propylene homopolymer is synthesized using methods, such as one in which crystalline propylene homopolymer portions are synthesized in the first step of polymerization, and the crystalline propylene homopolymer portions is copolymerized with propylene, ethylene, or another α-olefin in the second or subsequent step of polymerization.

The production method of the polypropylene-based resin is not particularly limited, and the polypropylene-based resin can be produced by any well-known methods, such as a method including polymerizing propylene or another monomer in the presence of a catalyst. Specifically, for example, an example includes a method including polymerizing propylene or another monomer in the presence of the catalyst as and an alkylaluminum compound at a polymerization temperature from 0 to 100° C. under a polymerization pressure from 3 to 100 atm.

Examples of the catalyst used in the production of polypropylene-based resin include the titanium (III) chloride catalyst, and titanium halide catalysts supported on a carrier such as magnesium chloride. A chain transfer agent such as hydrogen may be added to adjust the molecular weight of the polymer in the production of polypropylene-based resin.

Either a batch process or a continuous process can be selected as the type of polymerization in the production of the polypropylene-based resin. The polymerization method can be selected from methods such as solution polymerization in a solvent such as butane, pentane, hexane, heptane, and octane; slurry polymerization; bulk polymerization in monomers under solvent-free conditions; and gas phase polymerization in gaseous monomers.

In addition to the catalyst, as a third component, an electron donor compound can be used as an internal or external donor component to increase the isotacticity and/or the polymerization activity of polypropylene in the production of the polypropylene-based resin. Well-known electron donor compounds can be used as the electron donor compound, and examples thereof include ester compounds such as ε-caprolactone, methyl methacrylate, ethyl benzoate, methyl toluate, aromatic monocarboxylic acid esters, and alkoxy esters; phosphite esters such as triphenyl phosphite and tributyl phosphite; phosphoric acid derivatives such as hexamethylphosphoric triamide; alkoxy silanes such as aromatic alkylalkoxysilanes and aliphatic hydrocarbon alkoxysilanes; various ethers; various alcohols; and various phenols.

The melt flow rate (MFR) of the polypropylene-based resin (at 230° C. under a load of 2.16 kgf) is preferably from 0.01 to 300 g/10 min, more preferably from 0.1 to 100 g/10 min, and even more preferably from 0.1 to 30 g/10 min. By setting the MFR in the any of above ranges, it is possible to suitably balance the molding fluidity, the impact strength, and the weld strength.

Polypropylene-based resin having an MFR in any of these ranges may be used alone or in a combination of two or more.

In the case where the polyphenylene ether resin composition contains the polypropylene-based resin, a mixing agent is preferably contained from the viewpoint of improving the compatibility of the polyphenylene ether-based resin and the polypropylene-based resin. As the mixing agent for the polyphenylene ether-based resin and the polypropylene-based resin, any well-known mixing agent can be used. For example, the block copolymer and/or hydrogenated block copolymer as described above can be suitably used.

——Polyamide-Based Resin——

The polyphenylene ether resin composition may include a polyamide-based resin. Any polyamide-based resin may be used as the polyamide-based resin as long as an amide bond {—NH—C(=O)—} is contained in the repeating unit of the polymer main chain.

Examples of the polyamide-based resin include, for example, polymers or copolymers which are made from, as the main raw material, an amino acid, a lactam, or a diamine and a dicarboxylic acid.

Typical examples of raw materials of polyamide-based resin include amino acids such as 6-aminocaproic acid, 11-aminoundecanoic acid, 12-aminododecanoic acid, and para-aminomethyl benzoic acid; lactams such as ε-caprolactam and ω-laurolactam; aliphatic diamines such as tetramethylene diamine, pentamethylene diamine, hexamethylene diamine, 2-methylpentamethylene diamine, nonamethylene diamine, decamethylene diamine, undecamethylene diamine, dodecamethylene diamine, 2,2,4-/2,4,4-trimethyl hexamethylene diamine, and 5-methyl nonamethylene diamine; aromatic diamines such as meta-xylene diamine and para-xylene diamine; alicyclic diamines such as 1,3-bis(aminomethyl)cyclohexane, 1,4-bis(aminomethyl)cyclohexane, 1-amino-3-aminomethyl-3,5,5-trimethyl cyclohexane, bis(4-aminocyclohexyl)methane, bis(3-methyl-4-amino cyclohexyl)methane, 2,2-bis(4-aminocyclohexyl)propane, bis(aminopropyl) piperazine, and aminoethyl piperazine; aliphatic dicarboxylic acids such as adipic acid, suberic acid, azelaic acid, sebacic acid, and dodecanedioic acid; aromatic dicarboxylic acids such as terephthalic acid, isophthalic acid, 2-chloroterephthalic acid, 2-methylterephthalic acid, 5-methylisophthalic acid, 5-sodium sulfoisophthalic acid, 2,6-naphthalene dicarboxylic acid, hexahydro terephthalic acid, hexahydro isophthalic acid; and alicyclic dicarboxylic acids such as 1,4-cyclohexane dicarboxylic acid, 1,3-cyclohexane dicarboxylic acid, 1,2-cyclohexane dicarboxylic acid, and 1,3-cyclopentane dicarboxylic acid.

In the present embodiment, two or more polyamide homopolymers or copolymers derived from these raw materials may be blended.

Specific examples of the polyamide-based resin include Polyamide 6, Polyamide 66, Polyamide 46, Polyamide 410, Polyamide 56, Polyamide 510, Polyamide 610, Polyamide 612, Polyamide 106, Polyamide 1010, Polyamide 1012, Polyamide 11, Polyamide 12 Polyamide 4T, Polyamide 5T, Polyamide 6I, Polyamide 6T, Polyamide 9T, Polyamide 10I, Polyamide 10T, MXD6, MXD10, PXD6, PXD10, polyamide copolymers containing at least two different polyamide components selected from these, or mixtures thereof.

In the case where the polyphenylene ether resin composition contains the polyamide-based resin, a compatibilizer is preferably contained from the viewpoint of improving the compatibility of the polyphenylene ether-based resin and the polyamide-based resin.

Examples of the compatibilizer that can be used in the present embodiment are described in detail in JP H8-48869 A, JP H9-124926 A, and other documents, and any of such well-known compatibilizers can be used and a combination thereof can also be used.

Among these various compatibilizers, examples of a particularly preferred compatibilizer include one or more selected from citric acid, maleic acid, itaconic acid, and anhydrides thereof. Among these, maleic anhydride and citric acid are more preferred.

——Polyphenylene Sulfide——

The polyphenylene ether resin composition may contain a polyphenylene sulfide. The polyphenylene sulfide may be classified into two types according to the production method thereof: linear polyphenylene sulfide resin (hereinafter sometimes referred to as "linear PPS") and crosslinked polyphenylene sulfide resin (hereinafter sometimes referred to as "crosslinked PPS").

The former linear PPS is a polymer containing typically 50 mol % or more, preferably 70 mol % or more, and even more preferably 90 mol % or more of an arylene sulfide repeating unit represented by the following Formula (3):

$$[—Ar—S—] \tag{3}$$

(where Ar represents an arylene group, and examples of the arylene group include, for example, p-phenylene group, m-phenylene group, substituted phenylene groups (the substituent is preferably an alkyl group having 1 to 10 carbon atoms or a phenyl group), p,p'-diphenylene sulfone group, p,p'-biphenylene group, a p,p'-diphenylene carbonyl group, and naphthylene group).

The linear PPS may be a homopolymer including one type of arylene group as the constituent unit, or may be a copolymer produced by mixing two or more different arylene groups from the viewpoints of the processability and the heat resistance. Among these, a linear polyphenylene sulfide resin having a repeating unit of p-phenylene sulfide as the main constituent is preferred because of its excellent processability and heat resistance as well as industrial availability.

The latter crosslinked (including semi-crosslinked) polyphenylene sulfide resin is produced by, after producing the above-described linear polyphenylene sulfide resin by polymerization, carrying out thermal treatment in the presence of oxygen at a temperature below the melting point of the polyphenylene sulfide resin to promote oxidative crosslinking to thereby suitably increase the polymer molecular weight and the viscosity.

Such PPSs (linear PPS and crosslinked PPS) may be acid-modified PPSs. An acid-modified PPS is produced by modifying a PPS as described above with an acid compound. Examples of the acid compound include unsaturated carboxylic acids such as acrylic acid, methacrylic acid, maleic acid, fumaric acid, maleic anhydride, and anhydrides thereof, saturated aliphatic carboxylic acids, and substituted aromatic carboxylic acids. Furthermore, inorganic compound-based acid compounds such as acetic acid, hydrochloric acid, sulfuric acid, phosphoric acid, silicic acid, and carbonic acid can also be exemplified as the acid compound.

—Additional Component—

Examples of the additional component include higher fatty acid bisamides; flame retardants; inorganic or organic fillers and reinforcing materials; heat stabilizers; antioxidants; metal deactivators; crystal nucleating agents; plasticizers (such as low molecular weight polyethylene, epoxidized soybean oil, polyethylene glycol, and fatty acid esters); weather (light) resistance-improving agents; slip agents; various colorants, mold release agents; compatibilizers; and mixing agents.

——Higher Fatty Acid Bisamide——

The polyphenylene ether resin composition may contain a higher fatty acid bisamide from the viewpoints of the impact resistance, the fluidity, the possibility of mold contamination, and the mold release property.

Inclusion of the higher fatty acid bisamide into the polyphenylene ether resin composition favorably balances the impact resistance, the fluidity, the possibility of mold contamination, and the mold release property, as compared to resin compositions containing other resin additives (e.g., metal salts of higher fatty acids such as stearic acid, behenic acid, or montanic acid, and magnesium, zinc, calcium, or the like; compounds of higher fatty acids and monoamines; ester compounds of higher fatty acids and alcohols, for example).

Such a higher fatty acid bisamide is a bisamide of a higher fatty acid, and preferred is a compound obtained through a dehydration reaction between a higher fatty acid and a diamine. As the higher fatty acid bisamide, a bisamide compound of a higher fatty acid and a linear aliphatic diamine having 2 to 6 carbon atoms are preferred from the viewpoint of the impact resistance.

Preferred aliphatic diamine are methylenediamine, ethylenediamine, and hexamethylenediamine.

The higher fatty acid is preferably a fatty acid having 10 to 25 carbon atoms, more preferably a fatty acid having 12 to 22 carbon atoms, and even more preferably a fatty acid having 14 to 22 carbon atoms, from the viewpoint of the impact resistance. Although the higher fatty acid may be either a saturated fatty acid or an unsaturated fatty acid, a saturated fatty acid is preferred.

Examples of the higher fatty acid bisamide include bisamide compounds obtained through a reaction of a higher fatty acid such as capric acid, lauric acid, stearic acid, behenic acid, and montanic acid, with a diamine such as methylene bisamine, ethylene bisamine, and hexamethylene bisamine.

The content of the higher fatty acid bisamide in the polyphenylene ether resin composition is preferably from 0.5 to 10 mass %, more preferably 0.5 to 5 mass %, and even more preferably from 0.5 to 3 mass %, with respect to 100 mass % of the polyphenylene ether resin composition, from the viewpoints of the impact resistance, the fluidity, the possibility of mold contamination, and the mold release property.

——Flame Retardant——

The polyphenylene ether resin composition may include a flame retardant from the viewpoint of imparting flame retardancy.

Such flame retardants may be used alone or in a combination of two or more.

Examples of the flame retardant include, for example, phosphorus-containing flame retardants and silicone flame retardants. Phosphorus-containing flame retardants well-known in the art, such as organic phosphorus compounds, red phosphorus, and inorganic phosphates, are preferred, among which phosphate ester compounds are more preferred.

Examples of the flame retardant include, but are not limited to, phosphate ester compounds such as trimethyl phosphate, triethyl phosphate, tripropyl phosphate, tributyl phosphate, tripentyl phosphate, trihexyl phosphate, tricyclohexyl phosphate, triphenyl phosphate, tricresyl phosphate, trixylenyl phosphate, cresilyl diphenyl phosphate, dicresylphenyl phosphate, dimethylethyl phosphate, methyldibutyl phosphate, ethyldipropyl phosphate, and hydroxyphenyl diphenyl phosphate; modified phosphate ester compounds produced by modifying these with various substituents; and condensed phosphate ester-based compounds of various condensation types. Among these, condensed phosphate ester-based compounds are preferred.

——Inorganic or Organic Filler and Reinforcing Material——

The polyphenylene ether resin composition may contain an inorganic or organic filler and/or reinforcing material from the viewpoint of improving the mechanical strength.

Examples of the inorganic or organic filler and/or reinforcing material include, but are not limited to, fibrous, granular, plate-like, and needle-like reinforcing materials such as glass fiber, potassium titanate fiber, gypsum fiber, brass fiber, stainless steel fiber, steel fiber, ceramic fiber, boron whisker fiber, mica, talc, silica, calcium carbonate, kaolin, calcined kaolin, wollastonite, zonotolite, apatite, glass beads, glass flakes, titanium oxide, carbon fiber, carbon black, polyacrylonitrile fiber, and aramid fiber. Among these, glass fiber, talc, and wollastonite are preferred, and glass fiber is more preferred.

These inorganic or organic fillers and/or reinforcing materials may be used alone or in a combination of two or more.

The inorganic or organic filler and/or reinforcing material may be surface treated with a surface treatment agent such as a silane coupling agent using a well-known method.

The content of the inorganic or organic filler and/or reinforcing material is preferably 20 mass % or less, more preferably 10 mass % or less, and even more preferably 5 mass % or less, with respect to 100 mass % of the polyphenylene ether resin composition, from the viewpoint of suitably producing a covering member having a large extensional length.

—Method of Producing Polyphenylene Ether Resin Composition—

The resin composition of the present embodiment can be produced, for example, by melt-kneading the polyphenylene ether-based resin, as well as optionally a resin component other than the polyphenylene ether-based resin and the additional component.

Examples of a melt-kneading machine that can be used for melt-kneading include, but are not limited to, heated melt-kneading machines such as a single screw extruder or a multi-screw extruder such as a twin screw extruder, a roller, a kneader, a Brabender Plastograph, and a Banbury mixer. In particular, a twin screw extruder is preferred from the viewpoint of the kneading performance. Specific example include the ZSK series manufactured by Werner & Pfleiderer, the TEM series manufactured by Toshiba Machine Co., Ltd., and the TEX series manufactured by The Japan Steel Works, Ltd.

The production method using an extruder will be described below.

The L/D (barrel effective length/barrel inner diameter) of the extruder is preferably 20 or more and 60 or less, and more preferably 30 or more and 50 or less.

The structure of the extruder is not particularly limited. However, a preferred extruder is provided with, in the flow direction of raw materials, a first raw material feeding inlet located on the upstream side, a first vacuum vent located downstream to the first raw material feeding inlet, a second raw material feeding inlet located downstream to the first vacuum vent (third and fourth material feeding inlets may be further provided downstream to the second material feeding inlet if necessary), and a second vacuum vent located downstream to second raw material feeding inlet. In particular, more preferred is an extruder provided with a kneading section upstream to the first vacuum vent, a kneading section between the first vacuum vent and the second material feeding inlet, and a kneading section between the second to fourth material feeding inlets and the second vacuum vent.

How the raw materials are fed to the second to fourth raw material feeding inlets is not particularly limited. However, the raw materials are preferably fed from an opening on a side of the extruder side using a forced side feeder, rather than merely feeding the raw materials from the openings of the second to fourth raw material feeding inlets of the extruder, because more stable feeding of the raw materials can be achieved.

Particularly, in the case where powdery raw material is used and reducing generation of crosslinked substances and carbonized materials caused by thermal history of the resin is desirable, it is more preferable to use a forced side feeder for feeding the raw materials from the side of the extruder, and it is even more preferable to provide respective forced side feeders to the second to fourth raw material feeding inlets to thereby feed portions of a powdery raw material separately.

In the case where a liquid raw material is added, it is preferably to add it into the extruder using a plunger pump, a gear pump, or the like.

Furthermore, the upper openings of the second to fourth material feeding inlets of the extruder can also be used as openings to vent the air contained in the raw materials.

The melt-kneading temperature and the screw rotation speed at the melt-kneading step of the polyphenylene ether-based resin composition are not particular limited. However, a temperature equal to or higher than the melting point temperature in the case of a crystalline resin or the glass transition temperature in the case of a non-crystalline resin can be selected, so that the resin can be heated to be melted and easily processed. Typically, an arbitrary temperature ranging from 200 to 370° C. is selected, and the screw rotation speed may be set between 100 and 1200 rpm.

In one specific aspect of the production method of the polyphenylene ether-based resin composition using a twin screw extruder, for example, the polyphenylene ether-based resin, the block copolymer and/or hydrogenated block copolymer, and the higher fatty acid bisamide are fed to the first material feeding inlet of the twin screw extruder, the heating and melting zone is set to the melting temperature of the polyphenylene ether-based resin, and melt-kneading is carried out at a screw rotation speed between 100 and 1200 rpm, preferably between 200 and 500 rpm. The polyphenylene ether-based resin, the block copolymer and/or hydrogenated block copolymer, and the higher fatty acid bisamide may be fed to the twin screw extruder by the batch from the first material feeding inlet of the extruder as described above. Alternatively, the second material feeding inlet, the third material feeding inlet, and the fourth material feeding inlet may be provided so that the raw materials may be fed separately.

Furthermore, for the purpose of reducing generation of crosslinked substances and carbonized materials caused by thermal history of the resin in the presence of oxygen, the oxygen concentrations in process lines along the addition routes of the respective raw materials to the extruder are preferably maintained to less than 1.0 volume %. The addition routes are not particularly limited, but specific examples include, in order, a stock tank, piping, a weighing feeder provided with a refill tank, piping, a feed hopper, and a twin screw extruder. The method to maintain such a low oxygen concentrations is not particularly limited, but introducing an inert gas into each process line that is made to be airtight is effective. Typically, the oxygen concentration is preferably maintained to be less than 1.0 volume % by introducing nitrogen gas.

In the case where the polyphenylene ether-based resin contains a component in the form of powder (having a volume average particle diameter of less than 10 μm), the production method of the resin composition provides the effect of further reducing the residue adhered to the screw of a twin screw extruder which is used to produce the polyphenylene ether resin composition. Further, the resin composition produced by the production method provides the effect of reducing generation of black spot foreign matters, carbonized materials, and other foreign matters.

In a specific production method of the polyphenylene ether resin composition, it is preferable to use an extruder in which the oxygen concentration at each raw material feeding inlet is controlled to be less than 1.0 volume %, and to carry out any of the following methods 1 to 3.

1. A production method including melt-kneading the polyphenylene ether-based resin to be contained in the polyphenylene ether resin composition (first kneading step); and feeding the entire amounts of the block copolymer and/or hydrogenated block copolymer and the higher fatty acid bisamide to the molten and kneaded product obtained in the first kneading step, followed by subsequent melt-kneading (second kneading step).
2. A production method including melt-kneading the entire amounts of the polyphenylene ether-based resin and the higher fatty acid bisamide to be contained in the polyphenylene ether resin composition (first kneading step); and feeding the entire amount of the block copolymer and/or hydrogenated block copolymer to the molten and kneaded product obtained in the first kneading step, followed by subsequent melt-kneading (second kneading step).
3. A method including melt-kneading the entire amounts of the polyphenylene ether-based resin, the block copolymer and/or hydrogenated block copolymer, and the higher fatty acid bisamide to be contained in the resin composition of the present embodiment.

In particular, because polyphenylene ether, the block copolymer and/or hydrogenated block copolymer in the case of having particular molecular structures, and the higher fatty acid bisamide are powdery and have poor biteability to the extruder, which makes an increase in the production volume per hour is difficult. In addition, longer residence time of the resin in the extruder tends to cause thermal degradation. In the production method 1 or 2 described above, each component is favorably mixed, decomposition caused by thermal degradation and generation of crosslinked substances and carbonized materials can be reduced, the production rate per hour of resin can be increased, and a resin composition having an excellent productivity and quality can be obtained. In view of the above, a resin composition obtained by the production method 1 or 2 is more preferred compared to a resin composition obtained by the production method 3.

—Properties of Polyphenylene Ether Resin Composition—

The Vicat softening point of the polyphenylene ether resin composition is preferably 140° C. or higher, more preferably from 150 to 200° C., and even more preferably from 160 to 200° C., from the viewpoint that thermal shrinkage (e.g., secondary shrinkage A after being subjected to thermal aging at 130° C. for 24 hours) of the covering member can be further reduced.

Note that the Vicat softening point is a value measured in accordance with JIS K 7206 A50, and specifically can be measured by the method described in the EXAMPLES section below.

The surface hardness of the polyphenylene ether resin composition is preferably 60 or more, more preferably 80 or more, and even more preferably 90 or more, from the viewpoint that the wiring component is made to be resistant to deformations.

Note that the surface hardness is a Rockwell hardness expressed in the M scale in accordance with JIS K 7202-2 using a test piece molded in accordance with ISO 10724-1, and specifically can be measured by the method described in the EXAMPLES section below.

The flexural modulus of the polyphenylene ether resin composition is preferably 1800 MPa or more, more preferably from 2000 to 3000 MPa, and even more preferably from 2200 to 3000 MPa, from the viewpoint that the wiring component is made to be resistant to deformations.

Note that the flexural modulus is a value measured in accordance with ISO 178 using a test piece molded in accordance with ISO 10724-1, and specifically can be measured using by method described in the EXAMPLES section below.

Production Method of Covering Member—

The covering member can be produced, for example, by injection molding of the polyphenylene ether resin composition. For example, the covering member can be produced by injection molding by feeding the polyphenylene ether resin composition prepared in the form of pellets, if necessary, into a mold cavity of an injection molding machine.

The mold temperature upon injection molding is preferably from 80 to 130° C., more preferably from 90 to 130° C., and even more preferably from 100 to 130° C., from the viewpoint that thermal shrinkage (e.g., secondary shrinkage A after being subjected to thermal aging at 130° C. for 24 hours) of the covering member can be further reduced.

The resin temperature upon injection molding is preferably from 250 to 330° C., more preferably from 260 to 330° C., and even more preferably from 270 to 330° C., from the viewpoint that thermal shrinkage (e.g., secondary shrinkage A after being subjected to thermal aging at 130° C. for 24 hours) of the covering member can be further reduced.

The holding pressure (holding pressure relative to the maximum injection pressure) upon injection molding is preferably from 20 to 90%, more preferably from 50 to 90%, and even more preferably from 70 to 90%, from the viewpoint that thermal shrinkage (e.g., secondary shrinkage A after being subjected to thermal aging at 130° C. for 24 hours) of the covering member can be further reduced.

The injection time upon injection molding is preferably 15 seconds or longer and more preferably 20 seconds or longer, from the viewpoint that thermal shrinkage (e.g., secondary shrinkage A after being subjected to thermal aging at 130° C. for 24 hours) of the covering member can be further reduced.

Applications of the wiring component of the present embodiment include, but are not particularly limited to, electrical facilities such as assembled batteries, secondary batteries, and distribution boards; electrical wiring in buildings; components for household appliances; and electrical circuits used in articles driven by a plurality of wheels on a road or a track, for example.

EXAMPLES

The following provides a more detailed description of this disclosure based on examples, but this disclosure is not limited by the following examples.

The raw materials used in examples and comparative examples are as follows.

—(a) Polyphenylene Ether (PPE)—

Polyphenylene ether (having a reduced viscosity of 0.42 dL/g measured in a chloroform solution with a concentration of 0.5 g/dL), which was obtained by oxidative polymerization of 2,6-xylenol —(b) Polystyrene-Based Resin—

High impact polystyrene (trade name: "Polystyrene H9405", manufactured by PS Japan Corporation)

—(c) Polyamide-Based Resin—

Polyamide 66 (VN=120 ml/g, RV=37, melting point=265° C., and peak temperature of temperature descending crystallization=230° C.)

—(d) Polyphenylene Sulfide—

Crosslinked PPS having a melt viscosity (measured after being held at 300° C. under a load of 196 N, and L/D of 10/1 for 6 minutes using a flow tester) of 60 Pa·s, and a volatile content of 160 mass ppm collected in a molten state at 320° C.

—(e) Block Copolymer—

SEBS (a copolymer formed from blocks of polystyrene-hydrogenated polybutadiene-polystyrene; number average molecular weight=170,000; number average molecular weight per polystyrene block=29,800; total styrene contents=35 mass %, 1,2-vinyl bonding amount=38%, hydrogenation ratio of polybutadiene part=98% or more; and containing 35 mass % of paraffin oil)

—(f) Compatibilizer—(f-1) Maleic anhydride (manufactured by Mitsubishi Chemical Corporation) (f-2) Styrene-glycidyl methacrylate copolymer containing 5 mass % of glycidyl methacrylate (weight average molecular weight=110,000)

—(g) Inorganic Filler—

Glass flake MICROGLAS FLEKA REFG-301 (manufactured by Nippon Sheet Glass Co., Ltd.)

—Electrically Conductive Member—

Copper plates and aluminum plates shaped as illustrated in FIG. 4(A) and having one of the following dimensions were prepared from JIS-H-3100 copper and JIS-H-4000 aluminum alloy, respectively, as electrically conductive members:

Thickness: 2.0 mm, width: 20 mm, and extension length: 480 mm, or

Thickness: 3.0 mm, width: 30 mm, and extension length: 620 mm Note that each electrically conductive member was formed as a member composed of a single component.

Examples 1 to 7 and Comparative Examples 1 to 2

—Polyphenylene Ether Resin Composition—

A resin composition was produced using a twin screw extruder ZSK-40 (manufactured by Coperion Inc.). This twin screw extruder was provided with a first material feeding inlet provided on the upstream to the flow direction of the material, and a first vacuum vent and a second material feeding inlet provided downstream to first material feeding inlet, and a second vent provided downstream to the second material feeding inlet.

Using the extruder configured as described above, polyphenylene ether of the component (a) and the high impact polystyrene of the component (b) were added from the first material feeding inlet in the composition listed in Table 1, and molten and kneaded under the conditions of an extrusion temperature from 270 to 320° C., a screw rotation speed of 300 rpm, and a discharge rate of 100 kg/hour to produce pellets of a polyphenylene ether resin composition containing HIPS (PPE/HIPS).

Example 8

A wiring component was manufactured in the same manner as in Example 1, except that the polyphenylene ether resin composition was a PA/PPE composition produced as described below, and a covering member was molded into a shape having the thickness, the ratio of the coverage, the average of clearances, and the occupancy of the electrically conductive member in the inner space of the covering member as listed in Table 1.

A resin composition was produced using a twin screw extruder ZSK-40 (manufactured by Coperion Inc.) at a blending ratio of 30.5 mass % of the polyphenylene ether-based resin of the component (a), 63 mass % of the polyamide resin of the component (c), 6.4 mass % of the block copolymer of the component (e), and 0.1 mass % of the compatibilizer of the component (f-1). This twin screw extruder was provided with a first material feeding inlet provided on the upstream to the flow direction of the material, and a first vacuum vent and a second material feeding inlet provided downstream to first material feeding inlet, and a second vent provided downstream to the second material feeding inlet.

Using the extruder configured as described above, the (a) component, the (e) component, and the (f-1) component were added from the first material feeding inlet, and the (c) component was fed from the second material feeding inlet provided downstream to the first material feeding inlet of the twin screw extruder. The barrel temperatures of the extruder were set at 320° C. from the first material feeding inlet to the first vacuum vent, and to 280° C. at the second material feeding inlet and downstream thereto. Pellets of a polyamide-containing polyphenylene ether resin composition (PA/PPE) were produced by carrying out melt-kneading under the conditions of a screw rotation speed of 300 rpm and a discharge rate of 100 kg/hour.

Example 9

A wiring component was manufactured in the same manner as in Example 1, except that the polyphenylene ether resin composition was a PPS/PPE composition produced as described below, and a covering member was molded into a shape having the thickness, the ratio of the coverage, the average of clearances, and the occupancy of the electrically conductive member in the inner space of the covering member as listed in Table 1.

A resin composition was produced using a twin screw extruder ZSK-40 (manufactured by Coperion Inc.) at a blending ratio of 24 mass % of the polyphenylene ether-based resin of the component (a), 54 mass % of the polyphenylene sulfide resin of the component (d), 2 mass % of the compatibilizer of the component (f-2), and 20 mass % of glass flakes of the component (g). This twin screw extruder was provided with a first material feeding inlet provided on the upstream to the flow direction of the material, and a first vacuum vent and a second material feeding inlet provided downstream to first material feeding inlet, and a second vent provided downstream to the second material feeding inlet.

Using the extruder configured as described above, the (a) component, the (d) component, and the (f-2) component were added from the first material feeding inlet, and the (g) component was fed from the second material feeding inlet provided downstream to the first material feeding inlet of the twin screw extruder. The barrel temperatures of the extruder were set at 310° C. from the first material feeding inlet to the first vacuum vent, and to 290° C. at the second material feeding inlet and downstream thereto. Pellets of a polyphenylene sulfide-containing polyphenylene ether resin composition containing polyphenylene sulfide (PPS/PPE) were produced by carrying out melt-kneading under the conditions of a screw rotation speed of 300 rpm and a discharge rate of 100 kg/hour.

—Covering of Electrically Conductive Member by Covering Member—

The resultant pellets of the polyphenylene ether resin composition were fed to an injection molding machine (product name: SE-180-HP, manufactured by Sumitomo Heavy Industries, Ltd.) under the molding conditions of the resin temperature, the mold temperature, the holding pressure relative to the maximum injection pressure, the injection time, and the cooling time as listed in Table 1, to thereby mold a covering member having the thickness, the ratio of the coverage, the average of clearances, and the occupancy ratio of the electrically conductive member in the inner space of the covering member as listed in Table 1.

The members listed in Table 1 were used as the electrically conductive members. In the case of the monolithic type, the electrically conductive member was covered by insert molding. In the case of the mating type, the electrically conductive member was covered by a plurality of molded products mated to each other so as to be attached to the electrically conductive member, the molded products being produced by injection molding.

[Evaluations]

The following measurements were carried out for the wiring components produced in the examples and comparative examples.

—Average of Clearances C and Occupancy Ratio—

The electrically conductive member covered by the covering member of each of the examples and the comparative examples was divided equally in the extension direction into four pieces. Measurements were carried out at the three cut locations by an X-ray CT scanner (apparatus: inspeXio SMX-255CT (manufactured by Shimadzu Corporation) under the X-ray conditions (X-ray target: W, X-ray tube voltage/current: 210). When a quadrisectioned location to be measured was a bent portion of the covering member, the measurement was made in a straight location closest to that location. The average of clearances C at the three locations (mm) was determined to be used as the average of clearances C (mm). As indicated in Equation (2) below, the ratio (%) of the cross-section (area S2) of the electrically conductive member present in the inner space of the covering member, to the cross-section (area S1) of the inner space of the covering member at each measurement location was determined, and the average was used as the occupancy ratio (%).

$$\text{Occupancy ratio (\%)} = S2/S1 \times 100 \quad (2)$$

—Thickness and Secondary Shrinkage A—

The covering member of each of the examples and comparative examples was allowed to stand in an environment of 23° C. and 50% RH for 7 days. After being allowed to stand, the plate was divided equally in the extension direction thereof into four pieces, and a square flat plate having side lengths of 10 mm in both the extension direction and the width direction was cut out from three locations at the center in the width direction. In cases where a quadrisectioned location for cutting out a flat plate was a bent portion of the covering member, a flat plate may be cut out at a straight location closest to that location. In the cases where the length in the width direction was less than 10 mm, the flat plate may be cut out so that the length was maximized.

The thickness (mm) at the center portion of the cut-out flat plate was measured with a micrometer. Thereafter, the length corresponding to the extension direction of the covering member (referred to as the dimension L) was measured with a macroscope (3D shape measuring instrument VR-3000 (manufactured by KEYENCE CORPORATION)) before thermal aging. The flat plate was then placed in an oven to carry out thermal aging at 130° C. for 24 hours. After completion of the thermal aging, the flat plate was removed from the oven and allowed to stand in an environment of 23° C. and 50% RH for 1 day. After being allowed to stand, the length corresponding to the extension direction of the covering member (referred to as the dimension L') was measured with the macroscope in the manner similar to the pre-thermal aging condition. The thermal shrinkage ratios of the respective samples were determined using the following formula (3), which was then averaged to be used as the secondary shrinkage A (%).

$$\text{Thermal shrinkage ratio (\%)} = (L-L')/L \times 100 \quad (3)$$

—Vicat Softening Temperature—

Pellets of the polyphenylene ether resin composition of each of the examples and comparative examples were fed to a screw in-line injection molding machine in which the cylinder was set between 270 and 320° C. and the mold was set between 60 and 120° C., to thereby mold a test piece type A in accordance with ISO 10724-1. This this test piece was used to measure the Vicat softening point (° C.) in accordance with JIS K 7206 A50.

—Surface Hardness—

The pellets of the polyphenylene ether resin composition of each of the examples and comparative examples were fed to a screw in-line injection molding machine in which the cylinder was set between 270 and 320° C. and the mold was set between 60 and 120° C., to thereby mold a test piece type A in accordance with ISO 10724-1. This test piece was used to measure the Rockwell hardness expressed in the M scale in accordance with JIS K 7202-2.

—Flexural Modulus—

The pellets of the polyphenylene ether resin composition of each of the examples and comparative examples were fed to a screw in-line injection molding machine in which the cylinder was set between 270 and 320° C. and the mold was set between 60 and 120° C., to thereby mold a test piece type A in accordance with ISO 10724-1. This test piece was used to measure the flexural modulus (MPa) according to ISO 178.

—Heat Cycle Test—

A wiring component of each of the examples and comparative examples was allowed to stand in an environment of 23° C. and 50% RH for 7 days or longer. After being allowed to stand, a thermal shock resistance test was conducted for 500 cycles using a thermal shock tester (DC2010S dew cycle tester (manufactured by Kusumoto Chemicals, Ltd.)). In the test, each cycle included heating at 120° C. for 30 minutes, lowering the temperature to −10° C. and maintaining the temperature to −10° C. for 30 minutes, and then raising the temperature to 120° C. The evaluation was made according to the following criteria: Good (superior) when no crack or displacement was observed, No good (inferior) when a crack and/or displacement were observed.

TABLE 1

| | | | Unit | Example 1 | Example 2 | Example 3 | Example 4 | Example 5 | Example 6 |
|---|---|---|---|---|---|---|---|---|---|
| Wiring member | Conducting member | Material | — | Cu | Cu | Cu | Cu | Cu | Al alloy |
| | | Extending length | mm | 480 | 480 | 480 | 620 | 620 | 480 |
| | | Averaged cross-sectional aera | mm² | 40 | 40 | 40 | 90 | 90 | 40 |
| | Covering member | Ratio of PPE/HIPS | mass % | 68/32 | 54/46 | 41/59 | 68/32 | 41/59 | 68/32 |
| | | PA/PPE | — | — | — | — | — | — | — |
| | | PPS/PPE | — | — | — | — | — | — | — |
| | | Vicat softening point of PPE resin composition | ° C. | 172 | 153 | 140 | 172 | 140 | 172 |
| | | Surface hardness of PPE resin composition | — | 90 | 86 | 84 | 90 | 84 | 90 |
| | | Flexural modulus of PPE resin composition | MPa | 2300 | 2400 | 2300 | 2300 | 2300 | 2300 |
| | | Secondary shrinkage A | % | 0.3 | 0.6 | 4.0 | 0.2 | 0.9 | 0.3 |
| | | Thickness | mm | 1.0 | 1.0 | 1.0 | 2.0 | 2.0 | 1.0 |
| | | Monolithic or mating type | — | Mating | Mating | Mating | Mating | Mating | Mating |

TABLE 1-continued

|  |  |  | Unit | | | | | | |
|---|---|---|---|---|---|---|---|---|---|
| | Molding conditions | Resin temperature | °C. | 330 | 320 | 310 | 330 | 310 | 330 |
| | | Mold temperature | °C. | 120 | 110 | 100 | 120 | 100 | 120 |
| | | Holding pressure relative to maximum injection pressure | % | 70 | 70 | 70 | 70 | 90 | 70 |
| | | Injection time | seconds | 25 | 25 | 25 | 25 | 25 | 25 |
| | | Cooling time | seconds | 15 | 15 | 15 | 15 | 15 | 15 |
| | Ratio of coverage | | % | 84 | 84 | 84 | 82 | 82 | 84 |
| | Average of clearances C | | mm | 0.5 | 0.5 | 0.5 | 1.0 | 1.0 | 0.5 |
| | Occupancy ratio of conductive member in inner space of covering member | | vol % | 62 | 62 | 62 | 70 | 70 | 62 |
| Evaluations | Heat cycle test | Presence or absence of crack or dislocation | — | Good | Good | Good | Good | Good | Good |

|  |  |  | Unit | Example 7 | Example 8 | Example 9 | Comp. Ex. 1 | Comp. Ex. 2 |
|---|---|---|---|---|---|---|---|---|
| Wiring member | Conducting member | Material | — | Cu | Cu | Cu | Cu | Cu |
| | | Extending length | mm | 480 | 620 | 620 | 480 | 480 |
| | | Averaged cross-sectional aera | mm² | 40 | 90 | 90 | 40 | 40 |
| | Covering member | Ratio of PPE/HIPS | mass % | 68/32 | — | — | 25/75 | 41/59 |
| | | PA/PPE | — | — | YES | — | — | — |
| | | PPS/PPE | — | — | — | YES | — | — |
| | | Vicat softening point of PPE resin composition | °C. | 172 | 200 | 181 | 125 | 140 |
| | | Surface hardness of PPE resin composition | — | 90 | 78 | 96 | 82 | 82 |
| | | Flexural modulus of PPE resin composition | MPa | 2300 | 2500 | 4700 | 2300 | 2300 |
| | | Secondary shrinkage A | % | 0.1 | 0.5 | 0.2 | 38.5 | 5.8 |
| | | Thickness | mm | 1.2 | 2.0 | 2.0 | 1.0 | 1.2 |
| | | Monolithic or mating type | — | Monolithic | Mating | Mating | Mating | Mating |
| | Molding conditions | Resin temperature | °C. | 330 | 300 | 310 | 280 | 290 |
| | | Mold temperature | °C. | 120 | 100 | 100 | 90 | 30 |
| | | Holding pressure relative to maximum injection pressure | % | 70 | 70 | 70 | 70 | 10 |
| | | Injection time | seconds | 25 | 25 | 25 | 25 | 10 |
| | | Cooling time | seconds | 15 | 15 | 15 | 15 | 30 |
| | Ratio of coverage | | % | 85 | 82 | 82 | 84 | 84 |
| | Average of clearances C | | mm | 0 | 1.0 | 1.0 | 0.5 | 0.5 |
| | Occupancy ratio of conductive member in inner space of covering member | | vol % | 100 | 70 | 70 | 62 | 62 |
| Evaluations | Heat cycle test | Presence or absence of crack or dislocation | — | Good | Good | Good | No good | No good |

INDUSTRIAL APPLICABILITY

The wiring component of the present disclosure can be used as wiring components in electrical facilities such as assembled batteries, secondary batteries, and distribution boards; electrical wiring components in buildings; wiring components for household appliances; and wiring components for electrical circuits in articles driven by a plurality of wheels on a road or track, for example.

REFERENCE SIGNS LIST

1 Wiring component
2 Electrically conductive member
3 Covering member
4 Mating section

The invention claimed is:

1. A wiring component comprising:
an electrically conductive member having an extension length of 450 mm or more; and
a covering member covering the electrically conductive member,
the covering member containing a polyphenylene ether resin composition, and
having a secondary shrinkage A (%) in an extension length direction of the covering member after being subjected to thermal aging at 130° C. for 24 hours satisfying the following Expression (1):

$$A < 12.5 \times e^{-0.92t} \quad (1)$$

(in the Expression (1), e represents the base of natural logarithm, and t represents a thickness (in mm)).

2. The wiring component according to claim 1, wherein an averaged cross-sectional area of the electrically conductive member is from 10.0 to 150 mm².

3. The wiring component according to claim 1, wherein the electrically conductive member is composed of a single component.

4. The wiring component according to claim 1, wherein a ratio of the coverage of the electrically conductive member by the covering member is from 70 to 95%.

5. The wiring component according to claim 1, wherein an average of distances C (average of clearances C) between the electrically conductive member and the covering member is 2 mm or less.

6. The wiring component according to claim 1, wherein the polyphenylene ether resin composition has a surface hardness of 60 or more.

7. The wiring component according to claim 1, wherein an occupancy ratio of the electrically conductive member in an inner space of the covering member is 40 volume % or more.

8. The wiring component according to claim 1, wherein the covering member comprises a plurality of members that are capable of mating with each other.

9. The wiring component according to claim 1, wherein the polyphenylene ether resin composition has a Vicat softening point of 140° C. or higher.

10. The wiring component according to claim 1, wherein the polyphenylene ether resin composition has a flexural modulus of 1800 MPa or more.

* * * * *